US012078941B2

(12) United States Patent
Uesugi et al.

(10) Patent No.: US 12,078,941 B2
(45) Date of Patent: Sep. 3, 2024

(54) TONER CONTAINER, IMAGE FORMING APPARATUS, AND SHUTTER UNIT

(71) Applicants: Takashi Uesugi, Shizuoka (JP); Gen Kitamura, Shizuoka (JP); Seiji Terazawa, Shizuoka (JP)

(72) Inventors: Takashi Uesugi, Shizuoka (JP); Gen Kitamura, Shizuoka (JP); Seiji Terazawa, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/029,670

(22) PCT Filed: Nov. 4, 2021

(86) PCT No.: PCT/IB2021/060193
§ 371 (c)(1),
(2) Date: Mar. 31, 2023

(87) PCT Pub. No.: WO2022/106945
PCT Pub. Date: May 27, 2022

(65) Prior Publication Data

US 2023/0384713 A1 Nov. 30, 2023

(30) Foreign Application Priority Data

Nov. 17, 2020 (JP) ................................ 2020-191163

(51) Int. Cl.
*G03G 15/08* (2006.01)

(52) U.S. Cl.
CPC ..... *G03G 15/0886* (2013.01); *G03G 15/0872* (2013.01)

(58) Field of Classification Search
CPC ........... G03G 15/0872; G03G 15/0886; G03G 15/0877; G03G 15/0865
See application file for complete search history.

(56) References Cited

U.S. PATENT DOCUMENTS 6,363,232 B1 3/2002 Flaherty
6,785,497 B1 * 8/2004 Hasebe .............. G03G 15/0886
222/DIG. 1

(Continued)

FOREIGN PATENT DOCUMENTS

EP 1548518 A1 6/2005
EP 2783259 A1 10/2014

(Continued)

OTHER PUBLICATIONS

International Search Report issued on Jan. 7, 2022 in PCT/IB2021/060193 filed on Nov. 4, 2021, 14 pages.

(Continued)

*Primary Examiner* — Jessica L Eley
(74) *Attorney, Agent, or Firm* — XSENSUS LLP

(57) ABSTRACT

A toner container includes a shutter and a seal. The shutter is pushed by a nozzle of the image forming apparatus in conjunction with a movement of the toner container in an installation direction to the image forming apparatus. The shutter causes the nozzle to insert into the toner container and communicates the nozzle with the toner container via an opening on a circumferential surface of the nozzle. The seal covers a circumferential surface of the shutter in a close state in which the shutter is not pushed by the nozzle and slidingly contacts the circumferential surface of the shutter and the circumferential surface of the nozzle during an opening operation in which the shutter is pushed by the nozzle. A length of the seal in the installation direction is longer than a length of the opening of the nozzle in the installation direction.

17 Claims, 8 Drawing Sheets

(56) References Cited

U.S. PATENT DOCUMENTS

| | | | | |
|---|---|---|---|---|
| 2003/0081969 | A1 | 5/2003 | Muramatsu et al. | |
| 2013/0330105 | A1 | 12/2013 | Komatsu et al. | |
| 2014/0270859 | A1 | 9/2014 | Hosokawa et al. | |
| 2014/0348551 | A1 | 11/2014 | Yamabe et al. | |
| 2016/0124346 | A1* | 5/2016 | Yamabe | G03G 15/0886 399/258 |
| 2016/0161885 | A1 | 6/2016 | Hosokawa et al. | |
| 2017/0102638 | A1 | 4/2017 | Yamabe et al. | |
| 2017/0108799 | A1 | 4/2017 | Hosokawa et al. | |
| 2017/0139350 | A1 | 5/2017 | Yano et al. | |
| 2019/0079432 | A1 | 3/2019 | Hosokawa et al. | |
| 2019/0243286 | A1 | 8/2019 | Tanaka et al. | |
| 2020/0142331 | A1 | 5/2020 | Hosokawa et al. | |
| 2020/0192243 | A1 | 6/2020 | Kitamura et al. | |
| 2021/0116839 | A1 | 4/2021 | Hosokawa et al. | |
| 2021/0116840 | A1 | 4/2021 | Hosokawa et al. | |

FOREIGN PATENT DOCUMENTS

| | | | | |
|---|---|---|---|---|
| EP | 3432077 | A1 | 1/2019 | |
| JP | 2007-178806 | | 7/2007 | |
| JP | 2014-199387 | A | 10/2014 | |
| JP | 2019-109551 | | 7/2019 | |
| JP | 2019-120850 | A | 7/2019 | |
| MH | 2016-018003 | | 2/2016 | |
| WO | WO2013/077474 | A1 | 5/2013 | |
| WO | WO-2018211995 | A1 * | 11/2018 | G03G 15/0886 |

OTHER PUBLICATIONS

Office Action issued May 14, 2024 in Japanese Patent Application No. 2020-191163, 10 pages.

* cited by examiner

TONER CONTAINER, IMAGE FORMING APPARATUS, AND SHUTTER UNIT

CROSS-REFERENCE TO RELATED APPLICATIONS

This application is based on PCT filing PCT/IB2021/060193, filed on Nov. 4, 2021, which claims the Paris Convention priority to Japanese Patent Application No. 2020-191163, filed on Nov. 17, 2020, the contents of each are incorporated herein by reference in their entirety.

TECHNICAL FIELD

Embodiments of the present disclosure relate to a toner container to store toner therein, an image forming apparatus including the toner container, and a shutter unit disposed in the toner container.

BACKGROUND ART

Conventionally, in image forming apparatuses such as a copier, a printer, a facsimile machine, and multifunction peripherals (MFPs) including at least two of the copier, the printer, and the facsimile machine, an image forming apparatus is widely known in which a cylindrical toner container (i.e., a powder container) is detachably installed (e.g., see Japanese Unexamined Patent Application Publication No. 2016-018003). Specifically, the toner container (i.e., the powder container) in Japanese Unexamined Patent Application Publication No. 2016-018003 includes a shutter (i.e., a container shutter) that is pushed by a nozzle (i.e., a conveying tube) disposed in a main body of the image forming apparatus in conjunction with an installation operation of the toner container to the main body of the image forming apparatus. Then, when the shutter is pushed by the nozzle, the nozzle is inserted into the toner container as it is. The nozzle and the toner container communicate with each other through an opening (i.e., a nozzle opening) formed on the peripheral surface of the nozzle. In this way, the toner stored inside the toner container is ready to be discharged to the outside through the nozzle.

CITATION LIST

Patent Literature

[PTL 1]
Japanese Unexamined Patent Application Publication No. 2016-018003

SUMMARY OF INVENTION

Technical Problem

When the conventional toner container is taken out from the main body of the image forming apparatus, a problem that toner is scattered from the vicinity of the shutter may occur. The present disclosure is made to solve the above-described problem, and an object of the present disclosure is to provide a toner container, an image forming apparatus, and a shutter unit in which toner scattering is unlikely to occur when the toner container is taken out from a main body of the image forming apparatus.

Solution to Problem

According to an embodiment of the present disclosure, a toner container is detachably attached to a main body of an image forming apparatus and includes a shutter and a seal. The shutter is pushed by a nozzle of the image forming apparatus in conjunction with a movement of the toner container in an installation direction to the image forming apparatus. The shutter causes the nozzle to insert into the toner container and communicates the nozzle with the toner container via an opening on a circumferential surface of the nozzle. The seal covers a circumferential surface of the shutter in a close state in which the shutter is not pushed by the nozzle and slidingly contacts the circumferential surface of the shutter and the circumferential surface of the nozzle during an opening operation in which the shutter is pushed by the nozzle. A length of the seal in the installation direction is longer than a length of the opening of the nozzle in the installation direction.

Advantageous Effects of Invention

According to the present disclosure, there can be provided a toner container, an image forming apparatus, and a shutter unit in which toner scattering is unlikely to occur when the toner container is taken out from a main body of the image forming apparatus.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
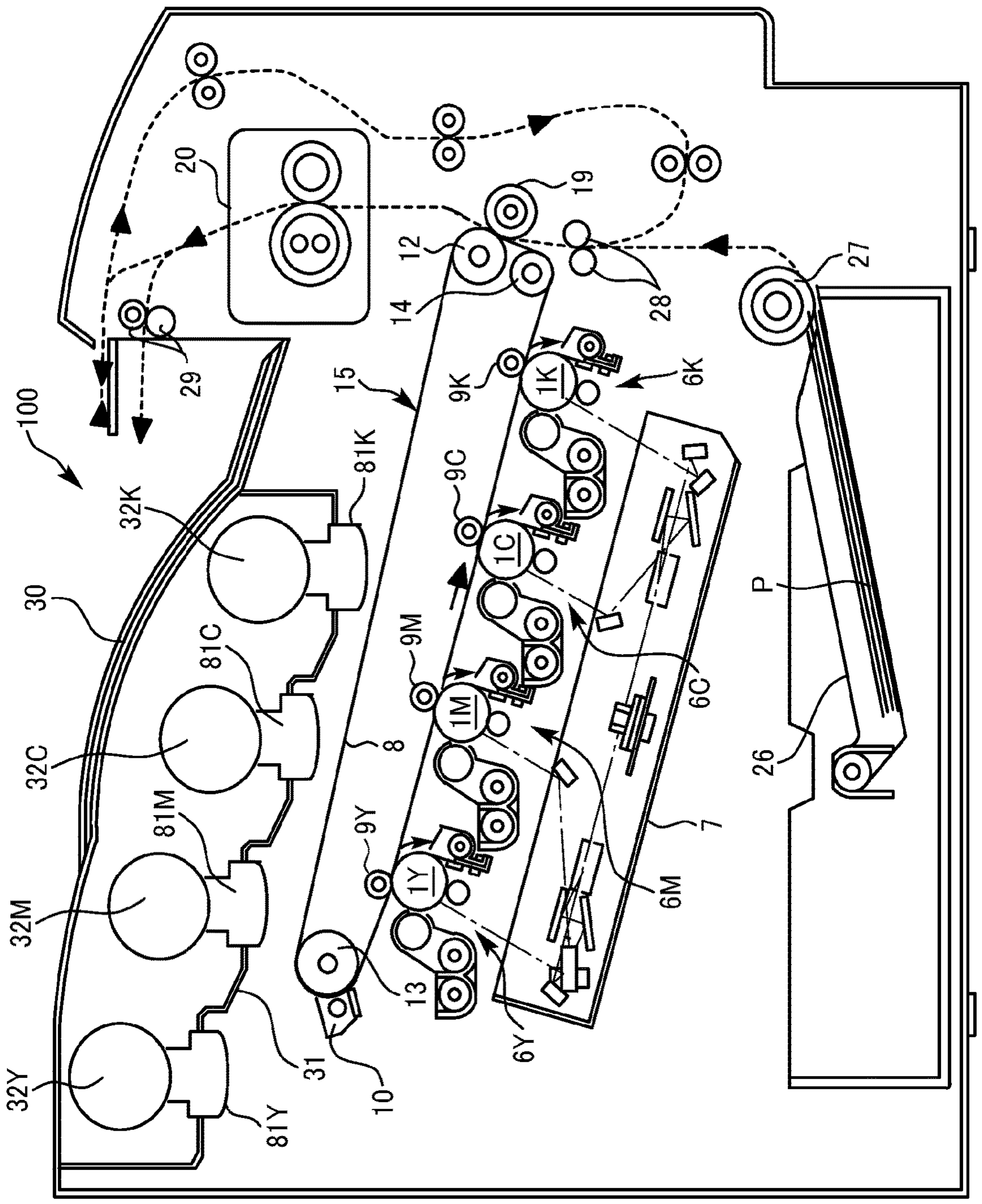
FIG. 1 is a schematic diagram illustrating an overall configuration of an image forming apparatus according to an embodiment of the present disclosure.

The terminology used herein is for the purpose of describing particular embodiments only and is not intended to be limiting of the present invention. As used herein, the singular forms “a,” “an,” and “the” are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

With reference to the drawings, embodiments of the present disclosure are described below in detail. Note that identical reference numerals are assigned to identical or equivalent components and a description of those components may be simplified or omitted.

Figure 2:
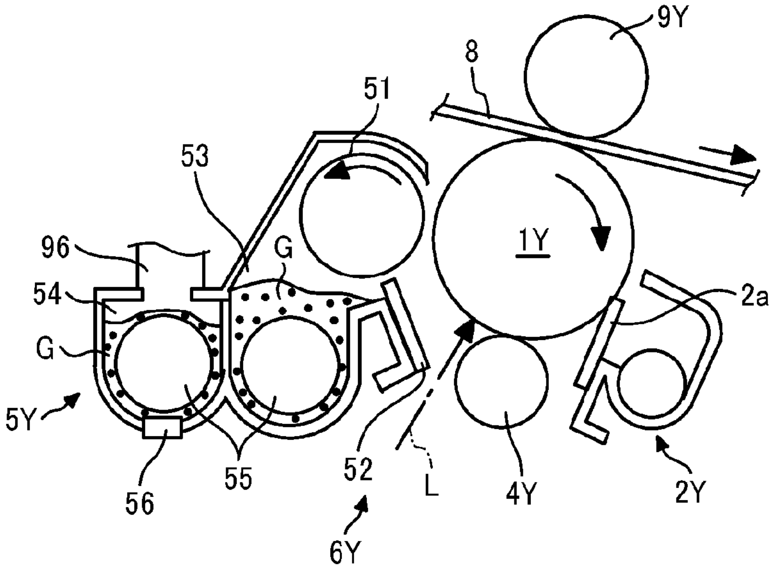
FIG. 2 is a cross-sectional view of an image forming unit of the image forming apparatus in FIG. 1.
Figure 3:
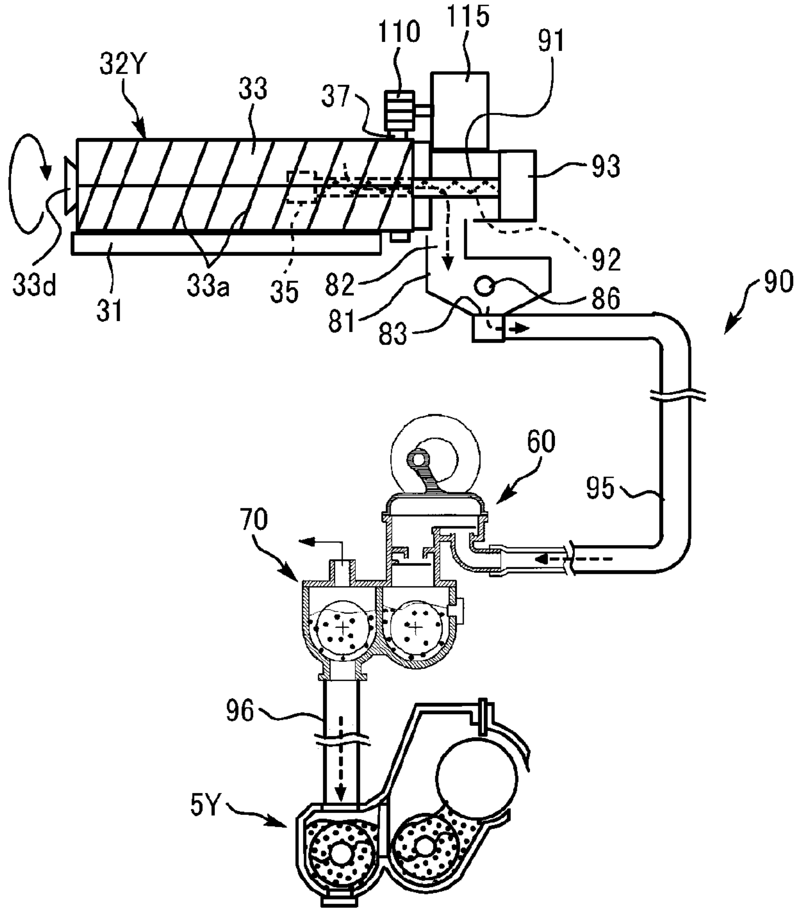
FIG. 3 is a schematic view of a toner supply device of the image forming apparatus and the vicinity thereof.

Referring to FIGS. 1 to 3, a configuration and operation of an image forming apparatus 100 is described below. FIG. 1 is a schematic view illustrating a configuration of a printer as the image forming apparatus 100. FIG. 2 is an enlarged schematic view of an image forming unit 6Y of the image forming apparatus 100. FIG. 3 is a schematic view illustrating a configuration of a toner supply device 90 and a vicinity thereof. As illustrated in FIG. 1, a main body of an image forming apparatus 100 includes an installation section 31 (serving as a toner container rack) in which substantially cylindrical toner containers 32Y, 32M, 32C, and 32K are detachably attached. That is, the four toner containers 32Y, 32M, 32C, and 32K correspond to four colors, that is, yellow, magenta, cyan, and black, respectively. Below the toner containers 32Y, 32M, 32C, and 32K, hoppers 81Y, 81M, 81C, and 81K of toner supply devices are disposed, respectively. An intermediate transfer unit 15 is disposed below the installation section 31. Image forming units 6Y, 6M, 6C, and 6K are arranged side by side, facing an intermediate transfer belt 8 of the intermediate transfer unit 15 to form toner images of yellow, magenta, cyan, and black, respectively.

Referring to FIG. 2, the image forming unit 6Y for yellow includes a photoconductor drum 1Y (serving as an image bearer), a charging device 4Y, a developing device 5Y, a cleaning device 2Y, and a discharging device that are disposed around the photoconductor drum 1Y. Image forming processes (i.e., charging, exposure, development, transfer, cleaning, and discharging processes) are performed on the photoconductor drum 1Y, and thus a yellow toner image is formed on the surface of the photoconductor drum 1Y.

The other three image forming units 6M, 6C, and 6K also have almost the same configuration as the image forming unit 6Y corresponding to yellow, except a configuration that the toner colors used are different. Thus, only the image forming unit 6Y is described below and descriptions of the other three image forming units 6M, 6C, and 6K are appropriately omitted.

Referring to FIG. 2, the photoconductor drum 1Y is rotated clockwise in FIG. 2 by a drive motor. The charging device 4Y uniformly charges the surface of the photoconductor drum 1Y (charging process). When the surface of the photoconductor drum 1Y reaches a position at which the surface of the photoconductor drum 1Y is irradiated with laser beam L emitted from an exposure device 7 (i.e., a writing device, see FIG. 1), the photoconductor drum 1Y is scanned with the exposure light L. Thus, an electrostatic latent image corresponding to yellow is formed on the photoconductor drum 1Y (exposure process).

When the surface of the photoconductor drum 1Y reaches a position facing the developing device 5Y, the electrostatic latent image is developed with toner into a yellow toner image (development process). When the surface of the photoconductor drum 1Y bearing the toner image reaches a position facing a primary transfer roller 9Y via the intermediate transfer belt 8, the toner image on the photoconductor drum 1Y is transferred onto the intermediate transfer belt 8 (primary transfer process). After the primary transfer process, a slight amount of untransferred toner remains on the photoconductor drum 1Y.

When the surface of the photoconductor drum 1Y reaches a position facing the cleaning device 2Y, a cleaning blade 2*a* collects the untransferred toner from the photoconductor drum 1Y into the cleaning device 2Y (cleaning process). The surface of the photoconductor drum 1Y reaches a position facing the discharging device, and the residual potential is removed from the surface of the photoconductor drum 1Y. Thus, a series of image forming processes performed on the surface of the photoconductor drum 1Y is completed.

Note that the other image forming units 6M, 6C, and 6K perform the series of image forming processes described above in substantially the same manner as the image forming unit 6Y. That is, the exposure device 7 disposed below the image forming units 6M, 6C, and 6K irradiates the photoconductor drums 1M, 1C, and 1K of the image forming units 6M, 6C, and 6K, respectively, with laser beams L based on image data. Specifically, in the exposure device 7, a light source emits the laser beam L, which is deflected by a polygon mirror rotated. The laser beam L then reaches the photoconductor drum 1 via multiple optical elements. Thus, the exposure device 7 scans the surface of each of the photoconductor drums 1M, 1C, and 1K with the laser beam L. Then, toner images formed on the photoconductor drums 1Y, 1M, 1C, and 1K through the development process are transferred and superimposed onto the intermediate transfer belt 8. Thus, a color toner image is formed on the intermediate transfer belt 8.

The intermediate transfer unit 15 includes the intermediate transfer belt 8, the four primary transfer rollers 9Y, 9M, 9C, and 9K, a secondary transfer backup roller 12, a cleaning backup roller 13, a tension roller 14, and an intermediate transfer belt cleaner 10. The intermediate transfer belt 8 is stretched around and supported by the three rollers (i.e., the secondary transfer backup roller 12, the cleaning backup roller 13, and the tension roller 14), and is rotated in the direction indicated by arrow illustrated in FIG. 1 as one of the multiple rollers that serves as a drive roller rotates (i.e., the secondary transfer backup roller 12).

The four primary transfer rollers 9Y, 9M, 9C, and 9K sandwich the intermediate transfer belt 8 together with the four photoconductor drums 1Y, 1M, 1C, and 1K, respectively, thus forming the four primary transfer nips between the intermediate transfer belt 8 and the photoconductor drums 1Y, 1M, 1C, and 1K. A primary transfer bias opposite in polarity to the toner is applied to the primary transfer rollers 9Y, 9M, 9C, and 9K. The intermediate transfer belt 8 is moved in the direction indicated by arrow in FIG. 1 and sequentially passes through the primary transfer nips formed by the primary transfer rollers 9Y, 9M, 9C, and 9K. Thus, the yellow, magenta, cyan, and black toner images on the photoconductor drums 1Y, 1M, 1C, and 1K are primarily transferred to and superimposed on the intermediate transfer belt 8, thereby forming a multicolor toner image.

Subsequently, the intermediate transfer belt 8 bearing the multicolor toner image reaches a position opposite a secondary transfer roller 19. At the position facing the secondary transfer roller 19, the secondary transfer backup roller 12 sandwiches the intermediate transfer belt 8 with the secondary transfer roller 19 to form a secondary transfer nip. The four-color toner images (i.e., yellow, magenta, cyan, and black) superimposed on the intermediate transfer belt 8 are secondarily transferred onto a sheet P (e.g., a paper) conveyed through the secondary transfer nip (a secondary transfer process). At this time, the untransferred toner may remain on the intermediate transfer belt 8 as a residual toner.

The surface of the intermediate transfer belt 8 then reaches a position opposite the intermediate transfer belt cleaner 10. At the position, the intermediate transfer belt cleaner collects the untransferred toner from the intermediate transfer belt 8. Thus, a series of transfer processes performed on the intermediate transfer belt 8 is completed.

The sheet P is conveyed from a sheet feeder 26 disposed in a lower portion of the main body of the image forming apparatus 100 to the secondary transfer nip via a feed roller 27 and a registration roller pair 28. Specifically, the sheet feeder 26 contains a stack of multiple sheets P such as sheets of paper stacked on one on another. As the feed roller 27 is rotated counterclockwise in FIG. 1, the feed roller 27 feeds a top sheet P from the stack in the sheet feeder 26 to a roller nip between the registration roller pair 28.

The sheet P conveyed to the registration roller pair 28 (serving as a timing roller pair) temporarily stops at the roller nip between the rollers of the registration roller pair 28 that stops rotating. Subsequently, the registration roller pair 28 is rotated to convey the sheet P to a secondary transfer nip, timed to coincide with the arrival of the multicolor toner image on the intermediate transfer belt 8. Thus, the desired color toner image is transferred onto the sheet P.

Subsequently, the sheet P, onto which the multicolor image is transferred at the secondary transfer nip, is conveyed to a position of a fixing device 20. Then, at this position, the color image transferred to the surface of the sheet P is fixed on the sheet P by heat and pressure of the fixing roller and the pressure roller (fixing process). Thereafter, the sheet P bearing the fixed toner image is conveyed through a roller nip formed by an output roller pair 29 and ejected by the output roller pair 29 onto an outside of the image forming apparatus 100. The sheets P ejected by the output roller pair 29 are sequentially stacked as output images on a stack tray 30. Thus, a series of image forming processes performed by the image forming apparatus 100 is completed.

Next, a detailed description is provided of a configuration and operations of the developing device as a supplied portion of the image forming unit with reference to FIG. 2. The developing device 5Y includes a developing roller 51, a doctor blade 52, two conveying screws 55, and a toner detector 56. The developing roller 51 faces the photoconductor drum 1Y. The doctor blade 52 faces the developing roller 51. The two conveying screws 55 are disposed within developer containers 53 and 54. The toner detector 56 detects a concentration of toner in a developer G. The developing roller 51Y includes magnets and a sleeve. The magnet is secured inside the developing roller 51Y. The sleeve rotates around the magnets. The developer containers 53 and 54 contain the two-component developer G including carrier (i.e., carrier particles) and toner (i.e., toner particles).

The developing device 5Y described above operates as follows. The sleeve of the developing roller 51 rotates in a direction indicated by arrow in FIG. 2. The developer is borne on the developing roller 51 by a magnetic field generated by the magnets. As the sleeve rotates, the developer G moves along the circumference of the developing roller 51. The developer G in the developing device 5Y is adjusted so that the ratio of toner (i.e., toner concentration) in the developer G is within a predetermined range. Specifically, a toner supply device 90 (see FIG. 3) serving as a supply device supplies toner from the toner container 32Y to the developer container 54 (see FIG. 2) according to the toner consumption in the developing device 5Y.

The toner supplied to the developer container 54 is stirred and mixed with the developer G and circulated through the two developer containers 53 and 54 by the two conveying screws 55 (i.e., in a longitudinal direction perpendicular to the surface of the paper on which FIG. 2 is illustrated). The toner in the developer G is electrically charged by friction with the carrier and thus is attracted to the carrier. Both the toner and the carrier are borne on the developing roller 51 due to a magnetic force generated on the developing roller 51. The developer G borne on the developing roller 51 is conveyed in the direction indicated by arrow in FIG. 3 and reaches a position opposite the doctor blade 52Y. The doctor blade 52 adjusts the amount of the developer borne on the developing roller 51 to an appropriate amount. Thereafter, the developer on the developing roller 51 is conveyed to a position opposite the photoconductor drum 1Y (i.e., a developing area). The toner is attracted to the latent image formed on the photoconductor drum 1Y by an electric field generated in the developing area. Subsequently, as the sleeve rotates, the developer remaining on the developing roller 51 reaches an upper portion of the developer container 53 and separates from the developing roller 51.

Next, with reference to FIG. 3, a configuration and operations of the toner supply device 90 serving as the supply device is briefly described. The toner supply device 90 rotationally drives a container body 33 of the toner container 32Y (i.e., a powder container) disposed in the installation section 31 in a predetermined direction (i.e., in the direction indicated by arrow in FIG. 3), discharges the toner contained in the toner container 32Y to the outside of the toner container 32Y, and guides the toner to the developing device 5Y as the supplied portion via a sub-hopper 70. The toner supply device 90 includes a toner supply path (i.e., a toner conveyance path). To easily understand the configuration of the toner supply device 90, the toner container 32Y, the toner supply device 90, and the developing device 5Y are illustrated in FIG. 3 in different orientations from the actual arrangement. Actually, the longitudinal axis of the toner container 32Y and a part of the toner supply device 90 are perpendicular to the plane on which FIG. 3 is illustrated (see FIG. 1). In addition, the orientations and arrangement of conveying tubes 95 and 96 are also illustrated in a simplified manner.

The toner supply devices 90 supply the color toners contained in the toner containers 32Y, 32M, 32C, and 32K installed in the installation section 31 in the main body of the image forming apparatus 100 to the corresponding developing devices 5Y, 5M, 5C, and 5K, respectively. The amount of toner supplied to each developing device 5 is determined based on the amount of toner consumed in the corresponding developing device 5. The four toner supply devices 90 have a similar configuration except the color of the toner used in the image forming processes. Specifically, referring to FIG. 3 (and FIGS. 5A to 5C), when the toner container 32Y is attached to the installation section 31 of the main body of the image forming apparatus 100, a toner conveying nozzle 91 (i.e., nozzle) of the image forming apparatus 100 pushes and moves a shutter 35 of the toner container 32Y. As a result, the toner conveying nozzle 91 is inserted into the toner container 32Y (i.e., the container body 33) via a through-hole 34*a*1. Accordingly, the toner contained in the toner container 32Y can be discharged through the toner conveying nozzle 91. The toner container 32Y includes a gripper 33*d* at the bottom (i.e., left side in FIG. 3) of the toner container 32Y so that a user easily handles and installs the toner container 32Y in the installation section 31. The gripper 33*d* has an outer radius smaller than an outer radius of the container body 33. The user grips the gripper 33*d* to install the toner container 32Y in the installation section 31 and take out the toner container 32Y from the installation section 31.

Referring to FIG. 3, the toner container 32Y includes the container body 33 having a spiral groove 33*a* extending in the longitudinal direction (i.e., the left and right direction in FIG. 3) and the axial direction of the container body 33. Specifically, the spiral groove 33*a* is formed from an outer circumferential surface toward an inner circumferential surface of the container body 33 so that a rotation of the container body 33 convey the toner in the container body 33 from the left to the right in FIG. 3. The toner conveyed from the left to the right in FIG. 3 inside the container body 33 is discharged to the outside of the toner container 32Y through the toner conveying nozzle 91. In the present embodiment, the container body 33 having the spiral groove 33*a* is rotationally driven to convey toner. The toner container 32Y may be rotationally driven so that toner is conveyed from the left side to the right side in FIG. 3 inside the container body 33. For example, an inclined face may be formed inside the container body 33 or on the inner peripheral surface of the container body 33 so as to convey toner to the right side by rotational driving inside. In addition, the toner container 32Y includes a gear 37 meshing with a drive gear 110 of the main body of the image forming apparatus 100. A gear 37 is disposed on the outer circumferential surface of the head of the container body 33 (i.e., on the right side of the container body 33 in FIG. 3). When the toner container 32Y is installed to the installation section 31, the gear 37 of the container body 33 meshes with the drive gear 110 of the main body of the image forming apparatus 100. As a drive motor 115 is driven, the driving force is transmitted from the drive gear 110 to the gear 37, thus rotating the container body 33. The drive motor 115 and the drive gear 110 function as a driver to rotate the container body 33. A configuration and operations of the toner container 32Y are described in further detail later.

Referring to FIG. 3, a conveying screw 92 is disposed inside the toner conveying nozzle 91. As a motor 93 rotates the conveying screw 92, the conveying screw 92 conveys the toner flowing into the toner conveying nozzle 91 from an opening 91*a* (i.e., inflow port, see FIGS. 5A to 5C) in the toner container 32Y from the left to the right in FIG. 3. Thus, the toner is discharged through an outlet slot of the toner conveying nozzle 91 to the hopper 81. The hopper 81 is disposed below the outlet slot of the toner conveying nozzle 91 via a dropping path 82. The toner stored in the hopper 81 is conveyed downstream to the developing device 5 by a conveyor. The conveyance configuration by the conveyor in FIG. 3 is illustrated below. A suction port 83 is disposed in the bottom of the hopper 81, and coupled to one end of the conveying tube 95. The conveying tube 95 is made of a flexible rubber material with low affinity for toner, and the other end of the conveying tube 95 is coupled to a developer pump 60 (i.e., a diaphragm pump). The developer pump 60 is coupled to the developing device 5Y via the sub-hopper 70 and the conveying tube 96. In the toner supply device 90 with such a configuration, the drive motor 115 as the driver rotates the container body 33 of the toner container 32Y to discharge the toner stored in the toner container 32Y to the outside of the toner container 32Y through the toner conveying nozzle 91. The toner discharged from the toner container 32Y falls through the dropping path 82 and is stored in the hopper 81. The developer pump 60 operates to suck the toner stored in the hopper 81 together with air from the suction port 83 and convey the toner from the developer pump 60 to the sub-hopper 70 through the conveying tube 95. The toner conveyed to and stored in the sub-hopper 70 is appropriately supplied into the developing device 5Y via the conveying tube 96. That is, the toner in the toner container 32Y is conveyed in the direction indicated by dashed arrows in FIG. 3. The conveyor is not limited to the above-described configuration, and for example, the toner stored in the hopper 81 may be conveyed directly to the developing device 5Y by a screw disposed in the hopper 81.

A toner sensor 86 is disposed near the suction port 83 and indirectly detects a state in which the toner contained in the toner container 32Y is depleted (i.e., toner end state) or a state in which the toner contained in the toner container 32Y is nearly depleted (i.e., toner near end state). The toner is discharged from the toner container 32Y based on the detection result of the toner sensor 86. For example, a piezoelectric sensor or a transmission optical sensor may be used as the toner sensor 86. The height of the detection surface of the toner sensor 86 is set so that the amount of toner (i.e., a deposition height) deposited above the suction port 83 is a target value. A drive timing and a drive duration of the drive motor 115 are controlled to rotationally drive the toner container 32Y (i.e., the container body 33) based on the detection result of the toner sensor 86. Specifically, when the toner sensor 86 detects that the toner is not deposited on the detection surface of the toner sensor 86, the drive motor 115 is driven for a predetermined time. When the toner sensor 86 detects that the toner is present on the detection surface, the drive motor 115 stops. If the toner sensor 86 continuously detects that toner does not exist at the detection surface even when the above-described control is performed repeatedly, a controller of the image forming apparatus determines that the toner stored in the toner container 32Y is depleted (i.e., toner end state) or a state that the toner contained in the toner container 32Y is nearly depleted (i.e., toner near end state).

Next, referring to FIGS. 4, 5A, 5B, and 5C, a detailed description is provided of the toner containers 32Y, 32M, 32C, and 32K further in detail. FIGS. 4, 5A, 5B, and 5C are cross-sectional side views of the toner container 32Y. The drawings are illustrated from the direction opposite to the drawing direction of the toner container 32Y in FIG. 3. The drawings are reversed left and right).

As described above with reference to FIGS. 1 to 3, the toner container 32Y stores toner therein and is detachably attached to the main body of the image forming apparatus 100. Referring to FIGS. 4, 5A, 5B, and 5C, the toner container 32Y includes the container body 33 and a shutter unit (i.e., including a holder 34, the shutter 35, a rod 36, and a compression spring 38). The shutter unit includes the holder 34, the shutter 35, the rod 36, and the compression spring 38. The holder 34 has an attachment 34*a* functioning as a cap. The container body 33 is fixed to the attachment 34*a* (i.e., the holder 34) and is a bottle with the spiral groove 33*a* formed on the inner circumferential surface of the container body 33. The holder 34 (and the shutter 35, the rod 36, and the compression spring 38) having the attachment 34*a*, and the container body 33 are rotationally driven by the drive motor 115 as a driver disposed in the main body of the image forming apparatus 100 (i.e., the installation section 31) in the state in which the toner container 32Y is installed in the main body of the image forming apparatus 100 (i.e., the installation section 31). The toner stored the inside of the toner container 32Y is discharged via the toner conveying nozzle 91.

Referring to FIGS. 4, 5A, 5B, and 5C, the shutter 35 opens and closes the through-hole 34*a*1 to which the toner conveying nozzle 91 (which is installed in the main body of the image forming apparatus 100) is inserted in conjunction with the installation operation of the toner container 32Y to the main body of the image forming apparatus 100. The shutter 35 is made of a resin material and molded integrally together with the rod 36 which is described later. The shutter 35 is fitted into the through-hole 34*a*1 from the inside of the toner container 32Y and latched so as not to detach from the container body 33. Toner is not discharged to the outside of the toner container 32Y in the state in which the through-hole 34*a*1 is closed by the shutter 35. Toner is discharged to the outside of the toner container 32Y in the state in which the through-hole 34*a*1 is opened by the shutter 35. The through-hole 34*a*1 is a through-hole having a substantially columnar shape centered on the center of rotation of the container body 33. The shutter 35 is a stopper-shaped member to fit into the through-hole 34*a*1 having such a cylindrical shape.

The toner container 32Y includes a seal 40 to seal a gap between the shutter 35 and the through-hole 34*a*1 with the through-hole 34*a*1 being closed by the shutter 35. Specifically, the seal 40 is made of an elastic material such as foamed polyurethane or felt and sticked to the attachment 34*a* along the entire inner circumferential surface of the through-hole 34*a*1. The seal 40 seals the gap between the shutter 35 and the through-hole 34*a*1 in the state in which the through-hole 34*a*1 is closed by the shutter 35. The seal 40 seals the gap between the toner conveying nozzle 91 and the through-hole 34*a*1 so that the toner stored in the container body 33 does not leak from the through-hole 34*a*1 in the state in which the through-hole 34*a*1 is opened by the shutter 35. In the present embodiment, the length M in the longitudinal direction of the seal 40 is longer than the length N of the opening 91*a* of the toner conveying nozzle 91 in an insertion direction in which the toner conveying nozzle 91 is inserted to the toner container 32Y. This configuration is described later in detail.

Figure 4:
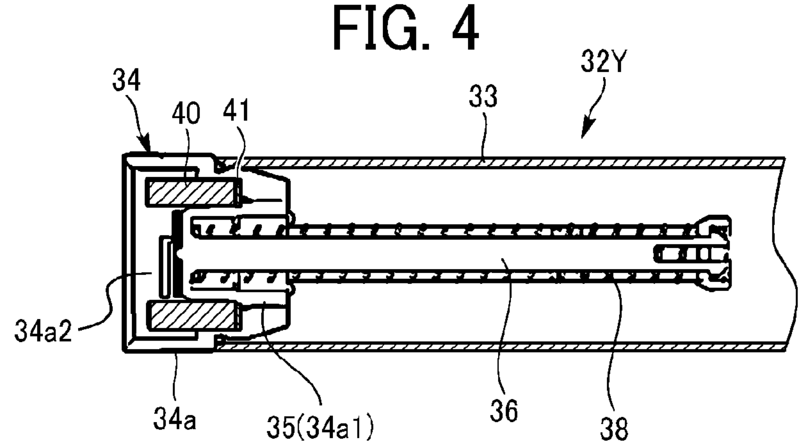
FIG. 4 is a cross-sectional view of a main part of a toner container.

The rod 36 is united with the shutter 35. The rod 36 extends in the opening and closing directions of the shutter 35 (i.e., the left and right direction in FIGS. 4, 5A, 5B, and 5C) inside the toner container 32Y. As illustrated in FIG. 4, the rod 36 is disposed so that the axis of the rod 36 substantially coincides with the rotation center of the container body 33. Such a configuration restrains a failure such as a positional displacement of the shutter 35 when the container body 33 is rotationally driven.

Referring to FIGS. 4, 5A, 5B, and 5C, the holder 34 includes the attachment 34*a* (i.e., the cap) and an extending portion 34*b*, and is secured to the container body 33. The holder 34 receives a rotational driving force from the main body of the image forming apparatus, and rotates around the conveying nozzle 91 with the container body 33.

The attachment 34*a* (i.e., the cap) of the holder 34 has the through-hole 34*a*1, and is vertically arranged in the direction in which the toner conveying nozzle 91 is inserted (i.e., the insertion direction, and the left and right direction in FIGS. 4, 5A, 5B, and 5C). The attachment 34*a* has an opening portion 34*a*2 (i.e., a cavity) that opens toward the front side in the insertion direction of the toner conveying nozzle 91 (i.e., upstream in the insertion direction and the left side of the toner container 32Y in FIGS. 4, 5A, 5B, and 5C). The opening portion 34*a*2 is a concave portion having a substantially columnar shape centered on the rotation center of the container body 33.

The extending portion 34*b* of the holder 34 holds the rod 36 movably in the opening and closing directions on the opposite side (i.e., the right side in FIGS. 4, 5A, 5B, and 5C) on which the shutter 35 is disposed inside the toner container 32Y. The extending portion 34*b* is formed in a substantially horseshoe shape so as to extend in the left and right direction of FIGS. 4, 5A, 5B, and 5C inside the toner container 32Y (i.e., the container body 33). The compression spring 38 as a biasing member is wound around the rod 36 between the shutter 35 and a wall of the extending portion 34*b*. The compression spring 38 biases the shutter 35 in the direction to which the through-hole 34*a*1 is closed (i.e., toward the left side in FIGS. 4, 5A, 5B, and 5C).

Figure 5A:
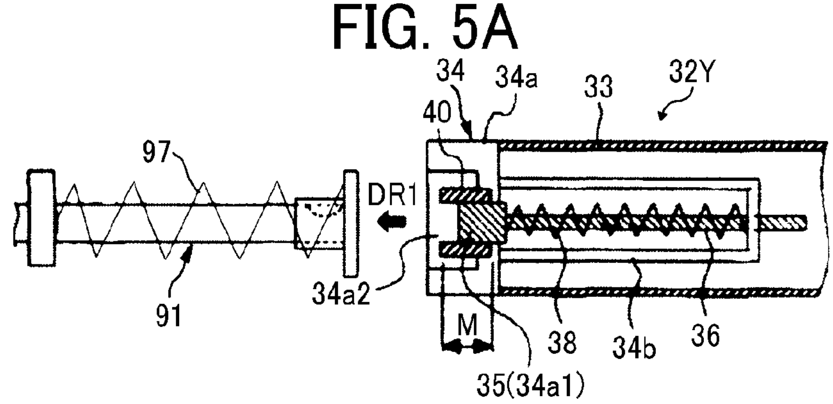
FIG. 5A is a schematic diagram illustrating an installation operation of a toner conveying nozzle to the toner container.

In such a configuration, the shutter 35 is pushed by the toner conveying nozzle 91 in conjunction with the installation operation of the toner container 32Y to the main body of the image forming apparatus 100 (i.e., the installation section 31). The shutter 35 moves to the inside of the toner container 32Y with the rod 36 against the biasing force of the compression spring 38 (i.e., the biasing member) and opens the through-hole 34*a*1. Specifically, the shutter 35 (and the rod 36) moves in the order as illustrated in FIGS. 5A and 5C to open the through-hole 34*a*1. In contrast, removing the toner container 32Y from the main body of the image forming apparatus 100 (i.e., the installation section 31) causes the toner conveying nozzle 91 to release the shutter 35 from the above-described pushed state, and the biasing force of the compression spring 38 moves the shutter 35 together with the rod 36 toward the through hole 34*a*1 to close the through-hole 34*a*1. Specifically, the shutter 35 (and the rod 36) moves in the order as illustrated in FIGS. 5C and 5A to close the through-hole 34*a*1. As illustrated in FIG. 5C, when the installation of the toner container 32Y in the main body of the image forming apparatus 100 is completed, the shutter 35 contacts the wall of the extending portion 34*b*, and the compression spring 38 is stored in a concave portion of the shutter 35. Such a configuration can prevent a problem that toner in the toner container 32Y adheres to the compression spring 38 when the toner container 32Y is set in the main body of the image forming apparatus 100.

Figure 5B:
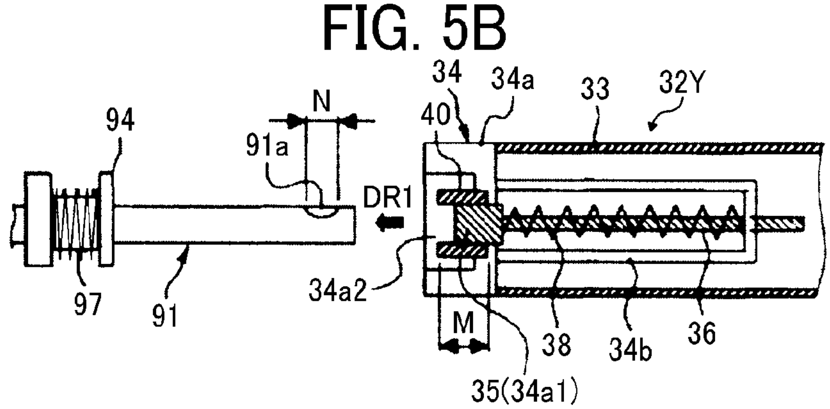
FIG. 5B is a schematic diagram illustrating the installation operation of the toner conveying nozzle to the toner container.
Figure 5C:
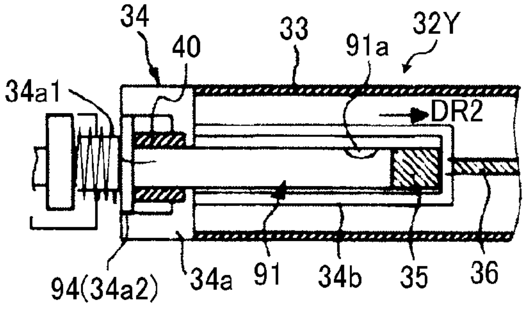
FIG. 5C is a schematic diagram illustrating the installation operation of the toner conveying nozzle to the toner container.

As illustrated in FIGS. 5A to 5C, the toner conveying nozzle 91 in the present embodiment has a fitting portion 94 to fit the opening portion 34*a*2 in conjunction with the insertion operation of the toner conveying nozzle 91 to the through-hole 34*a*1. Specifically, the fitting portion 94 has an outer diameter larger than the outer diameter of a main portion of the toner conveying nozzle 91. The fitting portion 94 has a substantially columnar shape to engage the opening portion 34*a*2 of the attachment 34*a*. The fitting portion 94 is slidable along the main portion of the toner conveying nozzle 91 in the installation direction of the toner container 32Y indicated by arrow DR1 in FIGS. 5A and 5B. Additionally, a compression spring 97 is attached on the toner conveying nozzle 91 to bias the fitting portion 94 downstream in the insertion direction, indicated by arrow DR2 in FIG. 5C, in which the toner conveying nozzle 91 is inserted into the toner container 32Y (i.e., toward the right side in FIGS. 5A to 5C). The fitting portion 94 also functions as a cover that covers the opening 91*a* of the toner conveying nozzle 91. As illustrated in FIG. 5A, the fitting portion 94 covers the opening 91*a* in the state in which the toner container 32Y is not set. When the toner container 32Y is set, as illustrated in FIG. 5C, the fitting portion 94 slides and moves, and the main portion of the toner conveying nozzle 91 is inserted to the inside of the container body 33. Note that FIG. 5B illustrates a state in which the opening 91*a* is exposed by sliding the fitting portion 94. With such a configuration, when the toner conveying nozzle 91 is inserted into the toner container 32Y in conjunction with the installation operation of the toner container 32Y, the fitting portion 94 is biased by the compression spring 97 to fit the opening portion 34*a*2. In contrast, when the toner conveying nozzle 91 is pulled out from the toner container 32Y in conjunction with the detaching operation of the toner container 32Y, the fitting portion 94 is pulled out from the opening portion 34*a*2.

Referring to FIGS. 4, 5A, 5B, 5C, 6A, and 6B, a configuration and operations of the toner container 32Y (i.e., the shutter unit including the holder 34, the shutter 35, the rod 36, and the compression spring 38) in the present embodiment are described below. As described above with reference to FIGS. 1, 2, 3, 4, 5A, 5B, and 5C, the toner container 32Y is detachably attached to the main body of the image forming apparatus 100 and includes the container body 33 and the shutter unit. The shutter unit includes, for example, the holder 34, the shutter 35, the rod 36, and the compression spring 38. The holder 34 holds the shutter 35 so as to be slidable, and is secured to the container body 33. The container body 33 is rotatably held together with the holder 34 in the main body of the image forming apparatus 100 with the insertion direction (i.e., the left and right direction of FIGS. 4, 5A, 5B, 5C, 6A, and 6B) as the rotation axis direction.

Figure 6A:
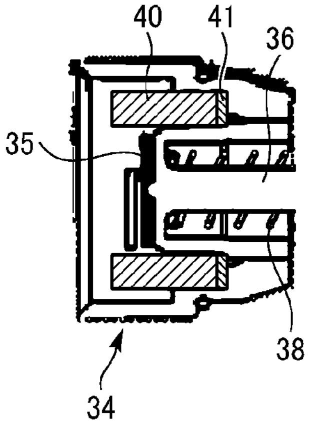
FIG. 6A is a schematic diagram illustrating a state before a movement of a shutter in the toner container.
Figure 6B:
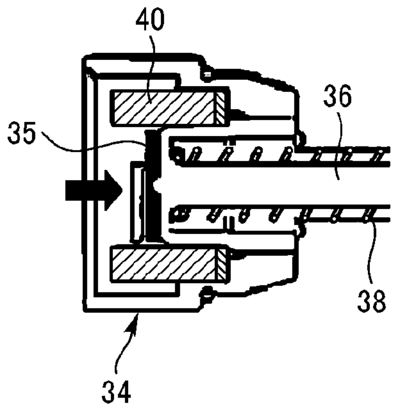
FIG. 6B is a schematic diagram illustrating a state after the movement of the shutter in the toner container.

The toner container 32Y includes the shutter 35 having a substantially columnar shape and the seal 40 having a substantially cylindrical shape. The shutter 35 is pushed by the toner conveying nozzle 91 as a nozzle disposed in the main body of the image forming apparatus 100 in conjunction with a movement (i.e., the movement to the left in FIGS. 4, 5A, 5B, 5C, 6A, and 6B) of the toner container 32Y in the predetermined installation direction to the main body of the image forming apparatus 100. When the shutter 35 is pushed by the toner conveying nozzle 91, the toner conveying nozzle 91 is inserted into the toner container 32Y and communicates with the toner container 32Y via the opening 91*a* (i.e., the inlet port) formed on the circumferential surface of the toner conveying nozzle 91. The seal 40 covers the circumferential surface of the shutter 35 in the closing state in which the shutter 35 is not pushed by the toner conveying nozzle 91 (i.e., nozzle), and slidingly contacts the circumferential surface of the shutter 35 and the circumferential surface of the toner conveying nozzle 91 in the opening operation in which the shutter 35 is pushed by the toner conveying nozzle 91. Specifically, in the present embodiment, as illustrated in FIGS. 6A and 6B, the seal 40 is adhered to the inner wall surface of the holder 34 via a double-sided tape 41.

Referring to FIGS. 5A to 5C, in the present embodiment, the length M of the seal 40 in the insertion direction of the toner conveying nozzle 91 is longer than the length N of the opening 91*a* of the toner conveying nozzle 91 (i.e., the nozzle) in the insertion direction. With such a configuration, when the toner container 32Y is removed from the main body of the image forming apparatus 100, a problem that toner scatters from the vicinity of the shutter 35 can be restrained. For example, when the length M of the seal 40 in the insertion direction is equal to or less than the length N of the opening 91*a* of the toner conveying nozzle 91 in the insertion direction (M N), an air flow is likely to occur when the toner container 32Y is pulled out from the main body of the image forming apparatus 100. Accordingly, the toner adhered to the shutter 35 may be blown up and scattered around. In the case of the relationship of M N, when the seal 40 is located in the center of the opening 91*a* in the process of inserting and removing the toner conveying nozzle 91, a communicating path between the inside of the toner container 32Y and the outside of the toner container 32Y may be generated. Accordingly, toner scattering is likely to occur. In contrast, in the present embodiment, since the length M of the seal 40 in the insertion direction is longer than the length N of the opening 91*a* of the toner conveying nozzle 91 in the insertion direction, an air flow is unlikely to occur when the toner container 32Y is pulled out from the main body of the image forming apparatus 100. The communicating path between the inside of the toner container 32Y and the outside of the toner container 32Y is unlikely to be generated in the process of inserting and removing the toner conveying nozzle 91. Thus, the occurrence of toner scattering is decreased.

In the present embodiment, one opening 91*a* is provided in the toner conveying nozzle 91. A plurality of openings 91*a* may be arranged side by side in the toner conveying nozzle 91 at intervals in the insertion direction. In such a case, "the length N of the opening 91*a* in the insertion direction" corresponds to the range in the insertion direction in which the plurality of openings 91*a* are arranged side by side.

First Variation

Figure 7:
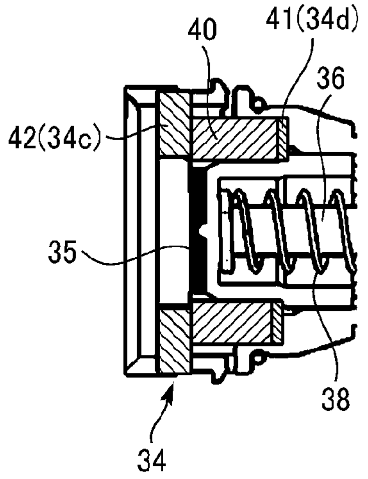
FIG. 7 is a schematic diagram illustrating a main part of a toner container of a first variation.
Figure 8:
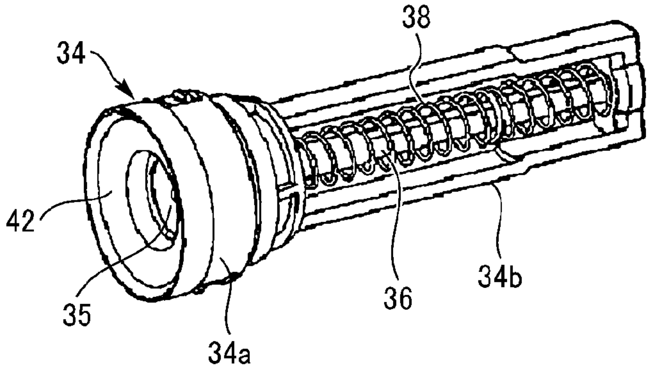
FIG. 8 is a perspective view of a shutter unit in the toner container of FIG. 7.

In the toner container 32Y (i.e., the shutter unit including the holder 34, the shutter 35, the rod 36, and the compression spring 38) in a first variation of the above-described embodiment, as illustrated in FIGS. 7 and 8, the seal 40 is compressed in the insertion direction (i.e., the left and right direction in FIG. 7). Specifically, the seal 40 has an upstream holding face 34*c* disposed upstream in the insertion direction inside the holder 34 and a downstream holding face 34*d* disposed downstream in the insertion direction inside the holder 34 and is compressed in the insertion direction between the upstream holding face 34*c* and the downstream holding face 34*d*. More specifically, the circular downstream holding face 34*d* as a plane substantially orthogonal to the insertion direction is disposed at the bottom of the opening 34*a*2 of the holder 34 (i.e., a cavity inside the holder 34, see FIG. 4). The cylindrical seal 40 is adhered to the downstream holding face 34*d* via the double-sided tape 41. Further, the holder 34 has a circular pressing portion 42 at a position facing the downstream holding face 34*d*. An end face of the pressing portion 42 functions as the upstream holding face 34*c*. The seal 40 is disposed between the pressing portion 42 and the downstream holding face 34*d* in a state of being compressed in the left and right direction in FIG. 7. With such a configuration, when the toner container 32Y is removed from the main body of the image forming apparatus 100, a problem that toner scatters from the vicinity of the shutter 35 can be restrained. The sealing performance of the seal 40 in the holder 34 is enhanced compared to the case where the seal 40 is not compressed in the insertion direction. Thus, an air flow is unlikely to occur when the toner container 32Y is removed from the main body of the image forming apparatus 100. In the first variation, as in the embodiment illustrated in FIGS. 5A, 5B, and 5C, the length M of the seal 40 in the insertion direction is set to be longer than the length N of the opening 91*a* of the toner conveying nozzle 91 in the insertion direction. Thus, the effect of reducing toner scattering can be further exerted.

Figure 9A:
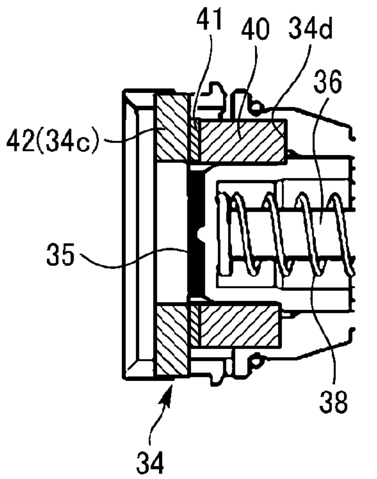
FIG. 9A is a cross-sectional diagram illustrating another example of the main part of the toner container in the first variation.
Figure 9B:
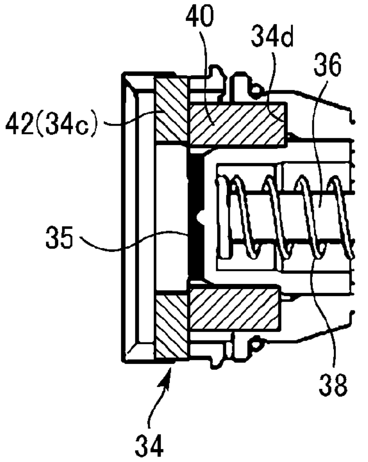
FIG. 9B is a cross-sectional diagram illustrating still another example of the main part of the toner container in the first variation.

As illustrated in FIG. 7, in the first variation, the position of the upstream holding face 34*c* of the holder 34 is substantially the same as the position of the upstream end face of the shutter 35 in the insertion direction in the closed state (i.e., the states illustrated in FIGS. 5A and 7). This structure enhances the sealing performance of the holder 34 by the seal 40 even in the process of inserting and removing the toner conveying nozzle 91. In the first variation, the seal 40 is adhered to the downstream holding face 34*d* of the holder 34 via the double-sided tape 41. As illustrated in FIG. 9A, the seal 40 may be adhered to the upstream holding face 34*c* of the holder 34 via the double-sided tape 41. Further as illustrated in FIG. 9B, the seal 40 may be sandwiched between the upstream holding face 34*c* and the downstream holding face 34*d* in the state in which the seal 40 is not adhered to the holder 34.

Second Variation

Figure 10:
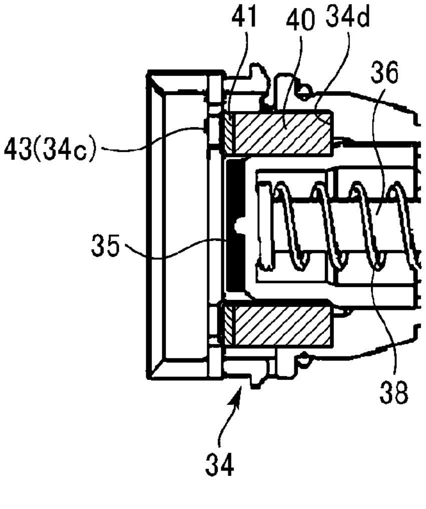
FIG. 10 is a schematic diagram illustrating a main part of a toner container of a second variation.
Figure 11:
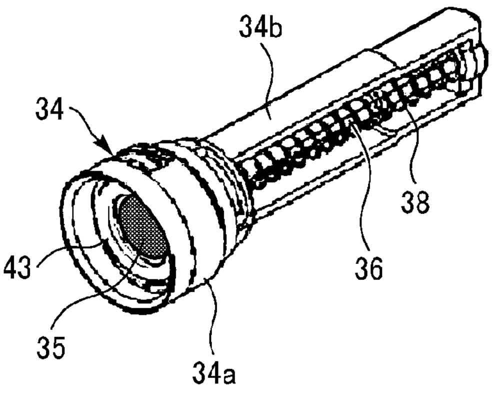
FIG. 11 is a perspective view of a shutter unit in the toner container of FIG. 10.
Figure 12A:
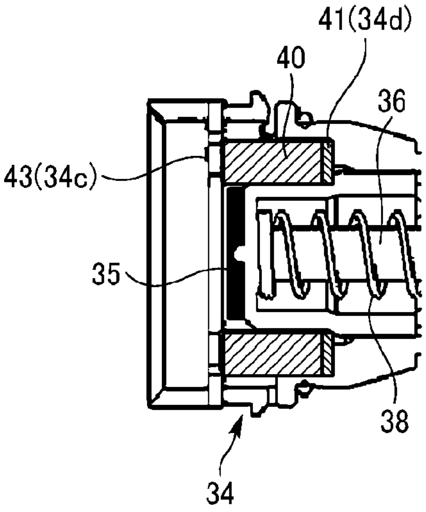
FIG. 12A is a cross-sectional diagram illustrating another example of the main part of the toner container in the second variation.
Figure 12B:
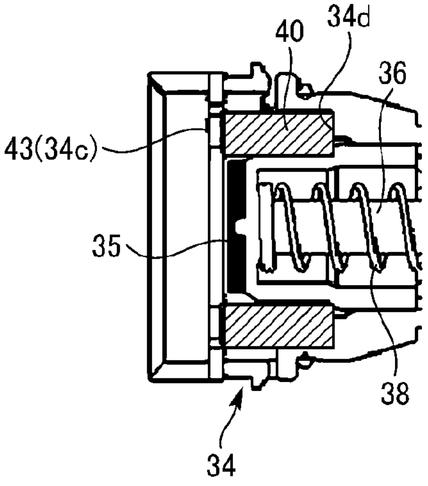
FIG. 12B is a cross-sectional diagram illustrating still another example of the main part of the toner container in the second variation.

In the toner container 32Y (i.e., the shutter unit including the holder 34, the shutter 35, the rod 36, and the compression spring 38) in a second variation of the above-described embodiment, as illustrated in FIGS. 10 and 11, the seal 40 is compressed between the upstream holding face 34*c* and downstream holding face 34*d* in the insertion direction (i.e., the left and right direction in FIG. 10) similar to the configuration in the first variation. In the holder 34 of the second variation, a pressing plate 43 having the upstream holding face 34*c* is detachably attached to the holder 34. Such a configuration facilitates the operation of assembling the seal 40 to the holder 34 at the time of new manufacturing or recycling manufacturing. Further, the operation of replacing or maintaining the seal 40 is facilitated. In particular, in the second variation, since the seal 40 is adhered to the pressing plate 43 (i.e., the upstream holding face 34*c*), such an operation can be efficiently performed. Even with a configuration such as the second variation, when the toner container 32Y is removed from the main body of the image forming apparatus 100, a problem that toner scatters from the vicinity of the shutter 35 can be restrained. In the second variation, as illustrated in FIG. 12A, the seal 40 may be attached to the downstream holding face 34*d* of the holder 34 via the double-sided tape 41. Further, as illustrated in FIG. 12B, the seal 40 may be sandwiched between the upstream holding face 34*c* and the downstream holding face 34*d* in the state in which the seal 40 is not adhered to the holder 34.

Third Variation

Figure 13:
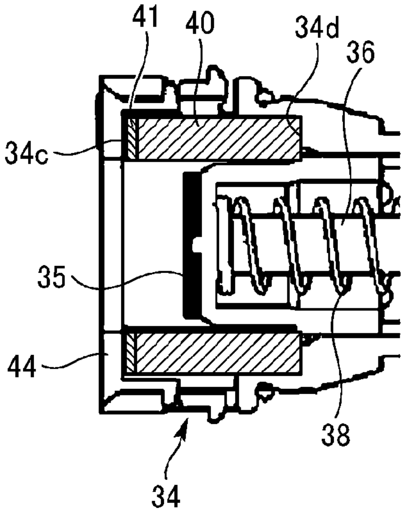
FIG. 13 is a schematic diagram illustrating a main part of a toner container of a third variation.
Figure 14:
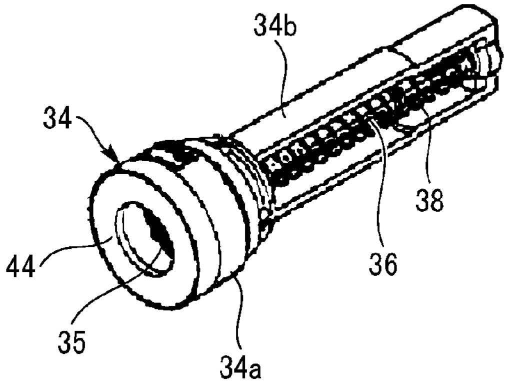
FIG. 14 is a perspective view of a shutter unit in the toner container in FIG. 13.

In the toner container 32Y (i.e., the shutter unit including the holder 34, the shutter 35, the rod 36, and the compression spring 38) in a third variation of the above-described embodiment, as illustrated in FIGS. 13 and 14, the seal 40 is compressed between the upstream holding face 34*c* and the downstream holding face 34*d* in the insertion direction (i.e., the left and right direction in FIG. 13) similar to the configurations in the first variation and in the second variation. In the holder 34 of the third variation, a lid 44 having the upstream holding face 34*c* is detachably attached to the holder 34. The lid 44 narrows the opening 34*a*2 (see FIG. 4) such that the exposure amount of the shutter 35 is reduced. Such a configuration can reduce a failure that an operator (e.g., a user) accidentally pushes the shutter 35 with a finger to open the shutter 35 when the operator holds the toner container 32Y. Even with a configuration such as the third variation, when the toner container 32Y is removed from the main body of the image forming apparatus 100, a problem that toner scatters from the vicinity of the shutter 35 can be restrained.

Fourth Variation

Figure 15:
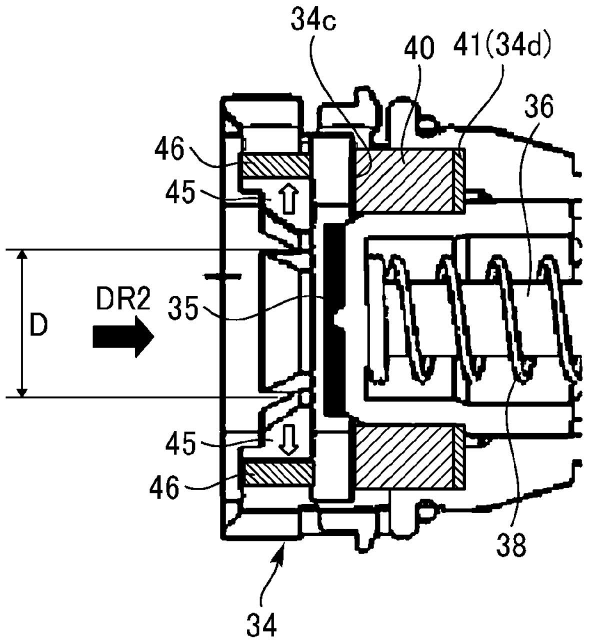
FIG. 15 is a schematic diagram illustrating a main part of a toner container of a fourth variation.
Figure 16:
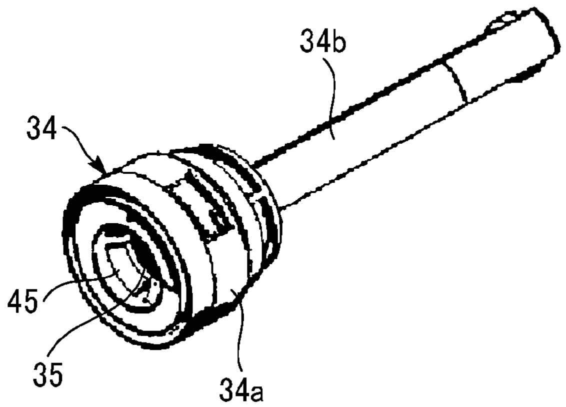
FIG. 16 is a perspective view of a shutter unit in the toner container in FIG. 15.

In the toner container 32Y (i.e., the shutter unit including the holder 34, the shutter 35, the rod 36, and the compression spring 38) in a fourth variation of the above-described embodiment, as illustrated in FIGS. 15 and 16, the holder 34 includes a claw 45 as a restricting member that restricts the exposure amount at which the shutter 35 is exposed upstream in the insertion direction. Specifically, the claw 45 (i.e., the restricting member) covers an end face of the shutter 35 so that the exposure amount D of the shutter 35 (i.e., the amount at which the shutter 35 is exposed to the opening portion 34*a*2) is smaller than the outer diameter of the shutter 35. The holder 34 includes a biasing member 46 (e.g., an elastic member such as a sponge, a flat spring, and a spring) that biases the claw 45 (i.e., the restricting member) in a direction to reduce the exposure amount described above. The claw 45 (i.e., the restricting member) is pushed by the toner conveying nozzle 91 (i.e., nozzle) in conjunction with the insertion of the toner conveying nozzle 91 in the insertion direction to the toner container 32Y and moves in the direction in which the above-described exposure amount increases against the biasing force of the biasing member 46 (i.e., a movement in the direction indicated by arrow DR2 in FIG. 15). Such a configuration can reduce a failure that the operator (e.g., the user) accidentally (i.e., getting in the way of the claw 45) pushes the shutter 35 with a finger to open the shutter 35 when the operator holds the toner container 32Y. Since the claw 45 moves so as not to interfere with the insertion of the toner conveying nozzle 91, the toner conveying nozzle 91 is normally inserted and removed. Even with a configuration such as the fourth variation, when the toner container 32Y is removed from the main body of the image forming apparatus 100, a problem that toner scatters from the vicinity of the shutter 35 can be restrained.

Fifth Variation

Figure 17:
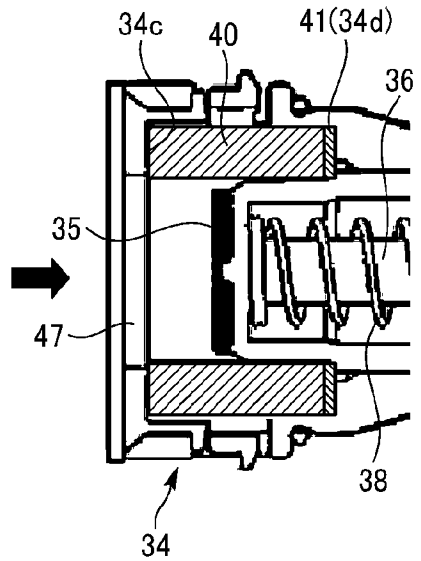
FIG. 17 is a schematic diagram illustrating a main part of a toner container of a fifth variation.
Figure 18:
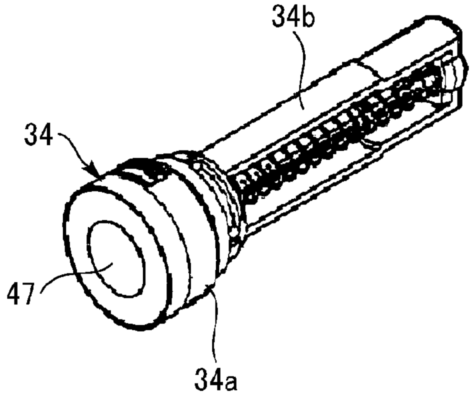
FIG. 18 is a perspective view of a shutter unit in the toner container in FIG. 17.
Figure 19:
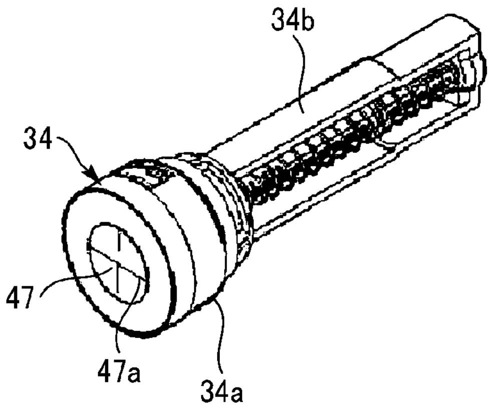
FIG. 19 is a perspective view of another example of the shutter unit in the toner container in the fifth variation.

In the toner container 32Y (i.e., the shutter unit including the holder 34, the shutter 35, the rod 36, and the compression spring 38) in a fifth variation of the above-described embodiment, as illustrated in FIGS. 17 and 18, the holder 34 includes a sheet-shaped member 47 that is pushed by the toner conveying nozzle 91 (i.e., nozzle) upstream in the insertion direction (i.e., the left side in FIG. 17) in conjunction with the insertion of the toner conveying nozzle 91 in the insertion direction into the toner container 32Y. Specifically, the sheet-shaped member 47 covers the opening portion 34*a*2 of the holder 34 (see FIG. 4) such that the shutter 35 does not expose. As described above with reference to FIGS. 5A to 5C, when the toner container 32Y is set, the sheet-shaped member 47 is pierced by the toner conveying nozzle 91, and the toner transfer nozzle 91 is inserted into the toner container 32Y. As the sheet-shaped member 47, for example, a thin sheet of paper or resin may be used. Such a configuration can reduce a failure that the operator (e.g., the user) accidentally (i.e., getting in the way of the sheet-shaped member 47) pushes the shutter 35 with a finger to open the shutter 35 when the operator holds the toner container 32Y. Even with a configuration such as the fifth variation, when the toner container 32Y is removed from the main body of the image forming apparatus 100, a problem that the toner scatters from the vicinity of the shutter 35 can be restrained. Since the sheet-shaped member 47 is torn so as not to interfere with the insertion of the toner conveying nozzle 91, the toner conveying nozzle 91 is normally inserted and removed. As illustrated in FIG. 19, the sheet-shaped member 47 may be provided with a notch 47*a* to accelerate tearing due to the pushing motion of the toner conveying nozzle 91. In such a case, since debris is less likely to be generated from the sheet-shaped member 47 torn by the pushing motion of the toner conveying nozzle 91, a problem that such debris is mixed into the toner container 32Y can be reduced.

As described above, the toner container 32Y in the present embodiment is detachably attached to the main body of the image forming apparatus 100. The shutter 35 is pushed by the toner conveying nozzle 91 as a nozzle disposed in the main body of the image forming apparatus 100 in conjunction with a movement of the toner container 32Y in the predetermined installation direction to the main body of the image forming apparatus. When the shutter 35 is pushed by the toner conveying nozzle 91, the toner conveying nozzle 91 (i.e., nozzle) is inserted into the toner container 32Y and communicates with the toner container 32Y via the opening 91*a* formed on the circumferential surface of the toner conveying nozzle 91. The seal 40 covers the circumferential surface of the shutter 35 in the closing state in which the shutter 35 is not pushed by the toner conveying nozzle 91, and slidingly contacts the circumferential surface of the shutter 35 and the circumferential surface of the toner conveying nozzle 91 in the opening operation in which the shutter 35 is pushed by the toner conveying nozzle 91. The length M the seal 40 in the installation direction is longer than the length N of the opening 91*a* of the toner conveying nozzle 91 in the insertion direction. With such a configuration, when the toner container 32Y is removed from the main body of the image forming apparatus 100, a problem that toner scatters from the vicinity of the shutter 35 can be restrained.

In the above-described embodiments, the present disclosure is applied to the toner container 32Y in which toner (i.e., one-component developer) is stored but is not limited to this. For example, the present disclosure may also be applied to a toner container in which a two-component developer is stored. Even such a case exhibits substantially the same advantages as the advantages of the above-described embodiments.

The above-described embodiments are illustrative and do not limit the present disclosure. Thus, numerous additional modifications and variations are possible in light of the above teachings. It is therefore to be understood that within the scope of the present disclosure, the present disclosure may be practiced otherwise than as specifically described herein. The number, position, and shape of the components described above are not limited to those embodiments described above. Desirable number, position, and shape can be determined to perform the present disclosure.

This patent application is based on and claims priority to Japanese Patent Application No. 2020-191163, filed on Nov. 17, 2020 in the Japan Patent Office, the entire disclosure of which is hereby incorporated by reference herein.

REFERENCE NUMERALS

5Y Developing device (Supplied portion)
32Y, 32M, 32C, and 32K Toner container (Powder container)
33 Container body
34 Holder
34*c* Upstream holding face
34*d* Downstream holding face
35 Shutter
40 Seal
41 Double-sided tape
42 Pressing portion
43 Pressing plate
44 Lid
45 Claw (Restricting member)
46 Biasing member
47 Sheet-shaped member
47*a* Notch
90 Toner supply device (Supply device)
91 Toner conveying nozzle (Nozzle)
91*a* Opening
100 Image forming apparatus (Main body of image forming apparatus)

The invention claimed is:

1. A system, comprising:
an image forming apparatus; and
a toner container to be detachably attached to the image forming apparatus, the toner container comprising:
a shutter to:
be pushed by a nozzle of the image forming apparatus in conjunction with a movement of the toner container in an installation direction to the image forming apparatus;
cause the nozzle to insert into a through-hole of the toner container; and
communicate the nozzle with the toner container via an opening on a circumferential surface of the nozzle; and
a seal, including an elastic material, disposed at an inner circumferential surface of the through-hole to:
cover a circumferential surface of the shutter in a closed state in which the shutter is not pushed by the nozzle; and
slidingly contact the circumferential surface of the shutter and the circumferential surface of the nozzle during an opening operation in which the shutter is pushed by the nozzle, and wherein a length of the seal in the installation direction is longer than a length of the opening of the nozzle in the installation direction.

2. The system according to claim 1, further comprising:
a holder to hold the shutter movably, the holder including:
an upstream holding face disposed upstream inside the holder in an insertion direction of the nozzle in which the nozzle is inserted into the toner container; and
a downstream holding face disposed downstream inside the holder in the insertion direction of the nozzle,
wherein the seal is compressed in the insertion direction of the nozzle between the upstream holding face and the downstream holding face.

3. The toner container according to claim 2, wherein:
the seal is adhered on the upstream holding face.

4. The toner container according to claim 2,
wherein a member including the upstream holding face is detachably attached in the holder.

5. The toner container according to claim 2, wherein:
a position of the upstream holding face of the holder in the insertion direction is substantially same as a position of an upstream end face of the shutter in the closed state in the insertion direction.

6. The toner container according to claim 2, wherein:
the holder includes a restrictor to restrict an exposure amount at which the shutter is exposed upstream in a direction in which the shutter is pushed by the nozzle.

7. The toner container according to claim 6, further comprising:
a biaser to bias the restrictor in a direction to decrease the exposure amount,
wherein the restrictor is to be pushed by the nozzle in conjunction with an insertion of the nozzle to the toner container and move in a direction to increase the exposure amount against a biasing of the biaser.

8. The toner container according to claim 2, further comprising:
a container body to be rotatably held with the installation direction as a rotation axis direction in the image forming apparatus,
wherein the holder is to hold the shutter movably in the rotation axis direction and be irrotationally held by the container body.

9. The toner container according to claim 8, wherein:
the holder includes a sheet-shaped element downstream from the seal in the installation direction, and
the sheet-shaped element is to be pushed and torn by the nozzle in conjunction with an insertion of the nozzle to the toner container.

10. The toner container according to claim 9, wherein:
the sheet-shaped element includes a notch to facilitate tearing due to a pushing motion of the nozzle.

11. The system according to claim 1, further comprising:
a holder to hold the shutter movably,
wherein the holder includes a restrictor to restrict an exposure amount at which the shutter is exposed upstream in a direction in which the shutter is pushed by the nozzle.

12. The system according to claim 1, further comprising:
a container body to be rotatably held with the installation direction as a rotation axis direction in the image forming apparatus; and
a holder to hold the shutter movably in the rotation axis direction and be irrotationally held by the container body.

13. A toner container to be detachably attached to an image forming apparatus, the toner container comprising:
a shutter to:
be pushed by a nozzle of image forming apparatus in conjunction with a movement of the toner container in an installation direction to the image forming apparatus;
cause the nozzle to insert into a through-hole of the toner container; and
communicate the nozzle with the toner container via an opening of the nozzle on a circumferential surface of the nozzle; and
a seal, including an elastic material, disposed at an inner circumferential surface of the through-hole to:
cover a circumferential surface of the shutter in a closed state in which the shutter is not pushed by the nozzle; and
slidingly contact the circumferential surface of the shutter and the circumferential surface of the nozzle during an opening operation in which the shutter is pushed by the nozzle, and
wherein a length of the seal in the installation direction is longer than a length of the opening of the nozzle in the installation direction.

14. An image forming apparatus, comprising:
a main body; and
the toner container according to claim 13 detachably attached in the main body.

15. A shutter unit to be disposed in a toner container detachably attached to an image forming apparatus, the shutter unit comprising:
a shutter to:
be pushed by a nozzle of the image forming apparatus in conjunction with a movement of the toner container in an installation direction to the image forming apparatus;
cause the nozzle to insert into a through-hole of the toner container; and
communicate the nozzle with the toner container via an opening of the nozzle on a circumferential surface of the nozzle; and
a seal, including an elastic material, disposed at an inner circumferential surface of the through-hole to:
cover a circumferential surface of the shutter in a closed state in which the shutter is not pushed by the nozzle; and
slidingly contact the circumferential surface of the shutter and the circumferential surface of the nozzle during an opening operation in which the shutter is pushed by the nozzle, and
wherein a length of the seal in the installation direction is longer than a length of the opening of the nozzle in the installation direction.

16. The shutter unit according to claim 15, wherein:
wherein the seal is compressed in the installation direction.

17. The toner container according to claim 13, wherein:
wherein the seal is compressed in the installation direction.

* * * * *